Figure 1:
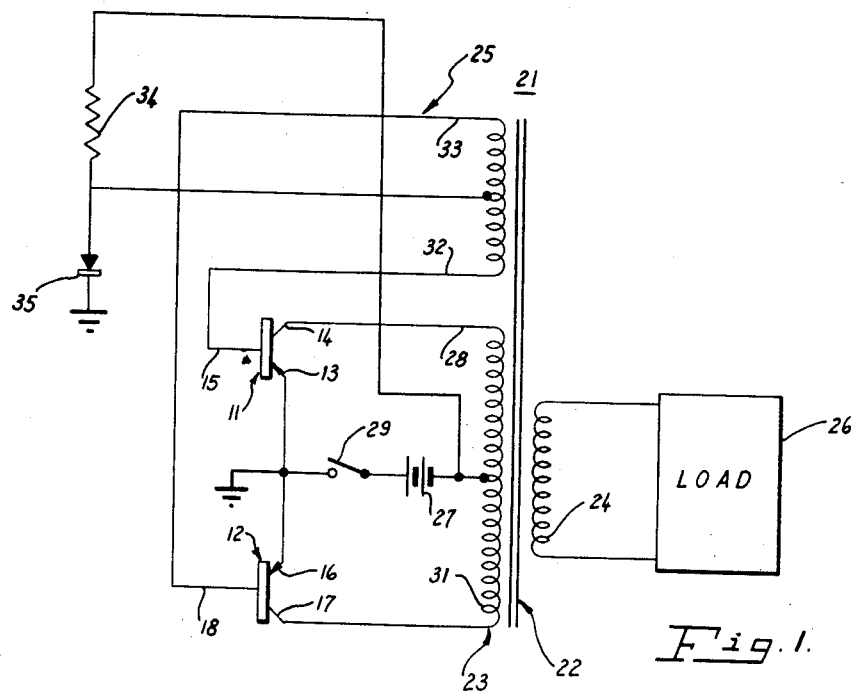

April 5, 1960

R. T. SCHULTZ 2,931,991

TRANSISTOR INVERTER

Filed July 17, 1956

ROBERT T. SCHULTZ,
INVENTOR

BY Billy a. Robbins

AGENT

United States Patent Office 2,931,991
Patented Apr. 5, 1960

2,931,991

TRANSISTOR INVERTER

Robert T. Schultz, Glendora, Calif., assignor, by mesne assignments, to Spectrol Electronics Corporation, a corporation of Delaware Application July 17, 1956, Serial No. 598,459

7 Claims. (Cl. 331—113)

This invention relates generally to transistor inverter circuits and more particularly to transistor inverters in which oscillations may be initiated under all load conditions.

Transistor inverters have been disclosed which perform the function of converting direct current voltage to alternating current voltage or to a higher direct current voltage which are satisfactory under some conditions. Examples of such inverters are those disclosed in the December 1954 issue of Electrical Manufacturing in an article by R. Lewis Bright, G. Frank Pittman, Jr., and George H. Royer, entitled "Transistors as On-Off Circuits in Saturable Core Circuits," with particular reference to Figure 3 on page 81 thereof; and the January 1955 issue of Proceedings of the IRE, page 99, in an article by George C. Uchrin and Wilfred O. Taylor, entitled "A New Self-Excited Square-Wave Transistor Power Oscillator."

While such circuits, as those disclosed in the above-referred-to articles, work quite well under some conditions, it has been found that when said circuits have loads connected thereto it becomes exceedingly difficult to initiate oscillations therein.

Circuits for such initiation, that is, starting, have been devised and are known to the art. The simplest of these is a voltage divider to which the control electrodes of the transistors are returned; however, in such a circuit the voltage divider is operating under all conditions and, therefore, creates an additional drain upon the power supply, thus causing low efficiency of operation due to unnecessarily wasted power. Another circuit, which has been devised to alleviate the starting problem hereinabove alluded to, is to employ an additional transistor between the control and common electrodes of each of the transistors. While this circuit operates satisfactorily, it requires additional components, adding to the expense of the item and also to the bulkiness thereof. The bulkiness of the inverter becomes an acute problem when the circuit is employed in aircraft or like apparatus wherein space becomes a premium.

Accordingly, an object of the present invention is to provide new transistor inverters which will start under all load conditions.

Another object of the present invention is to provide a starting circuit for transistor inverters which draws a minimum amount of current from the power supply, and which is isolated from the power supply once starting has been accomplished.

Still another object of the present invention is to provide transistor inverters which start under all load conditions and which utilize a minimum number of components, thus keeping the over-all size of the inverter as small as possible, while at the same time maintaining a high efficiency of operation.

A transistor inverter in accordance with the present invention includes two transistors, each having output, common and control electrodes, the common electrodes are interconnected and returned to a point of fixed potential. Connected between the output electrodes of the transistor is the primary winding of a transformer. The magnetic core of the transformer has a substantially rectangular hysteresis loop. Also wound upon the core is a feedback winding which is connected between the control electrodes of the transistor. A secondary winding is supplied to produce an output voltage. A first terminal of a source of potential is connected to the output electrode through the primary winding, while a second terminal is connected to the point of fixed potential. A uni-directional current flow device and an impedance element are connected in series at a common junction point and between said source of potential and said point of fixed potential. The common junction point is connected through the feedback winding to the control electrodes.

Figure 2:
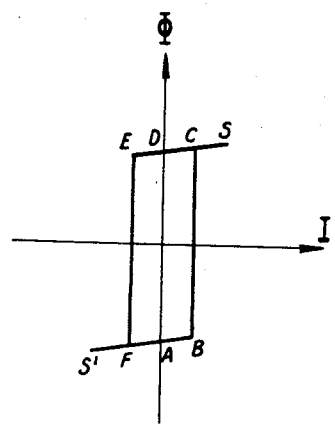

The novel features of the present invention are set forth in particularity in the appended claims. Other and more specific objects of the invention will become apparent from a consideration of the following description taken in conjunction with the accompanying drawing in which:

Fig. 1 is a schematic circuit diagram of a preferred embodiment of the present invention; and Fig. 2 is a graph illustrating the hysteresis loop of the magnetic core of the transformer employed in the circuit of Fig. 1.

Referring now more particularly to Fig. 1, there is shown two transistors 11 and 12. Transistor 11 includes a common electrode such as emitter 13, an output electrode such as collector 14 and a control electrode such as base 15, while transistor 12 includes a common electrode such as emitter 16, an output electrode such as collector 17 and a control electrode such as base 18. A transformer generally designated by 21 is utilized and includes a magnetic core 22 which has a substantially rectangular hysteresis loop. Wound upon core 22 is a primary winding 23, a secondary winding 24 and a feedback winding 25. A load device designated by rectangle 26 is connected across the terminals of secondary winding 24.

A source of potential 27 is connected between a center tap of primary winding 23 and switch 29, the other side of switch 29 being connected to a point of fixed potential, such as ground. The common electrodes of the transistors, that is, the emitters 13 and 16, in the presently preferred embodiment, are interconnected and returned to ground. Collectors 14 and 17, that is, the output electrodes, are connected across primary winding 23 at terminals 28 and 31, respectively.

The terminals 32 and 33 of feedback winding 25 are connected across the control electrodes, such as bases 15 and 18, respectively. An impedance element, such as resistor 34, is connected in series with a uni-directional current flow device, such as diode 35. This series combination is connected between the negative terminal of source of potential 27 and ground.

The center tap of feedback winding 25 is connected to the common junction point between resistor 34 and diode 35. It should be noted diode 35 is poled in such a manner that in a quiescent state of operation it is back biased.

In discussing the operation of the preferred embodiment of the present invention as shown in Fig. 1, reference is now made to Fig. 2 wherein the abscissa represents current and the ordinant flux. Upon the closing of switch 29, a negative potential is applied through primary winding 23 of transformer 22 to collectors 14 and 17. At the same time, a negative potential is applied from source 27 through feedback winding 25 to base electrodes 15 and 18. Upon application of the potential, one of transistors 11 and 12 begins to conduct more heavily than the other due to the inherent unbalance of the circuit. Assuming that transistor 11 becomes more conducting than transistor 12, a feedback potential is supplied due to transformer action by winding 25 of such a polarity that base 15 of transistor 11 is biased more negative, thus causing transistor 11 to become more conducting. At the same time a positive potential is supplied by the other portion of feedback winding 25 to base 18 of transistor 12, thus causing it to become more non-conducting. It should be noted that the voltage appearing at terminal 31 of primary winding 23 is also of such a polarity as to keep transistor 12 cut off. This process continues until transistor 11 becomes substantially saturated and transistor 12 becomes completely non-conducting. It is seen that this essentially connects battery 27 between the center tap and terminal 28 of primary winding 23. Primary winding 23 may now be viewed as an auto transformer, the primary winding being between the center tap and terminal 28 while the secondary winding is between terminals 28 and 31.

When this occurs, the flux within core 22 begins to change, due to current flowing through primary winding 23 between the center tap and terminal 28 threof. The flux follows the hysteresis loop as set forth in Fig. 2 and changes from point A thereon to B and thence to C. Upon reaching point C, the flux continues to change until it reaches the point of saturation S. At this point, core 22 is completely saturated and can no longer support voltage. Therefore, the voltage will immediately fall to zero and the flux begins to collapse. As this occurs, the potential appearing across feedback winding 25 reverses, thus causing transistor 11 to become non-conducting and transistor 12 conducting. Transistor 12 very quickly reaches the point of saturation, thus connecting battery 27 between the center tap of primary 23 and terminal 31 thereof. Current then flows through the last mentioned portion of primary winding 23, thus causing the flux within core 22 to traverse the hysteresis loop in a direction opposite to that hereinabove described, therefore, following the loop from point D to E and then to F, then from F to the other point of saturation S', whereat the voltage once more drops to zero and the flux about core 22 collapses, reversing the states of transistors 11 and 12.

During these changes of states between transistor 11 and 12, as hereinbefore described, a square wave voltage will be induced in secondary winding 24 due to conventional transformer action. This square wave voltage may be applied directly to an appropriate load or it may be first rectified, filtered and then applied to a load requiring a D.-C. voltage.

It is to be noted that upon initiation of the oscillation of the circuit of Fig. 1 base current flows from battery 27 through resistor 34, the center tap of winding 25 and thence to that transistor which has become conducting. Immediately upon the starting of the circuit, the current flow through resistor 34 substantially isolates battery 27 from the starting circuit. From this point on, the flow of current may be traced from ground through the appropriate emitter, its associated base, through feedback winding 25 to the center tap thereof, and thence through diode 35, returning to ground. It is seen that the common junction point between resistor 34 and diode 35 is maintained substantially at ground level once oscillation of the circuit of Fig. 1 has been established.

It is to be understood that the values for the components shown may vary according to any particular design consideration. The following values are given by way of example only for the circuit as shown in Fig. 1, which will oscillate at a frequency of approximately 1500 cycles per second.

Transistors 11 and 12—Transistor products P-N-P power transistors type X1002

Transformer 21:
    Primary winding 23—70 turns #20 wire
    Secondary winding 24—900 turns #30 wire
    Core 22—Arnold Engineering Co. Deltamax Core type 5778D2
    Feedback winding 25—14 turns #30 wire
Resistor 34—3,300 ohms
Diode 35—Transitron type TM1
Battery 27—27 volts It is to be expressly understood that although P-N-P transistors are shown in the presently preferred embodiment of the present invention as shown in Fig. 1, N-P-N transistors may also be used. If this is done, the polarities of battery 27 and diode 35 must be reversed. It is also to be expressly understood that the common base or common collector configurations for transistors 11 and 12 may also be employed without departing from the spirit or scope of this invention.

There has been thus disclosed a preferred embodiment of a transistor inverter circuit which will start under substantially all load conditions and which utilizes a minimum number of components while maintaining a high efficiency of operation.

What is claimed is:

1. A transistor inverter comprising: first and second transistors, each having output, control, and common electrodes, said common electrodes being interconnected and returned to a point of fixed potential; a source of potential; a transformer including at least first and second windings and a magnetic core having a substantially rectangular hysteresis loop, said first winding being connected between said control electrodes, while said second winding being connected between said output electrodes; means including said second winding interconnecting said output electrodes and said source of potential; starting means including an impedance element and a uni-directional current flow device connected in series at a common junction point and connected between said source of potential and said point of fixed potential; and means including said first winding interconnecting said common junction point and said control electrodes.

2. A transistor inverter comprising: first and second transistors, each having a collector, base and emitter, said emitters being interconnected and returned to a point of fixed potential; a source of potential; a transformer including first, second and third windings and a magnetic core having a substantially rectangular hysteresis loop, said first winding being connected between said bases of said first and second transistors while said second winding is connected between said collectors of said transistors; means including said second winding interconnecting said source of potential and said collectors starting means including a resistive impedance element and a uni-directional current flow device connected in series at a common junction point and connected between said source of potential and said point of fixed potential; and means including said first winding interconnecting said bases and said common junction point.

3. A transistor inverter comprising: first and second transistors, each having a collector, base and emitter, said emitters being interconnected and returned to a point of fixed potential; a source of potential; a transformer including a magnetic core having a substantially rectangular hysteresis loop, a primary winding having a first center tap, a secondary winding and a feedback winding having a second center tap, said feedback winding being connected between said bases of said first and second transistors while said primary winding is connected between said collectors of said transistors; said first center tap being connected to said source of potential; a load connected across said secondary winding; starting means including a resistive impedance element and a rectifying means connected in series at a common junction point and connected between said source of potential and said point of fixed potential; said second center tap being connected to said common junction point.

4. The transistor inverter as defined in claim 3, wherein said transistors are P–N–P junction transistors, said first center tap is connected to a negative terminal of said source of potential, and said rectifying means is a diode having its cathode connected to said point of fixed potential.

5. The transistor inverter circuit as defined in claim 3, wherein said resistive impedance element is a resistor having resistance sufficiently large to isolate said source of potential from said transistors upon the occurrence of oscillations of said inverter circuit and said rectifying means is a semiconductor diode.

6. A transistor inverter comprising: a pair of transistors, each including output, control and common electrodes, said common electrodes being interconnected and returned to a point of fixed potential; transformer means including first, second and third windings and a magnetic core having a substantially rectangular hysteresis loop, said first winding being connected across said output electrodes, said second winding being connected across said control electrodes, said third winding being connected across a load means; a source of energizing potential connected between said point of fixed potential and through said first winding to said output electrodes; and starting means connected through said second winding to said control electrodes for supplying initiating power thereto whereby said inverter becomes oscillatory, said starting means including a uni-directional current flow device to effectively isolate said starting means from said control electrodes upon the initiation of oscillations and a resistive impedance element for supplying power to said control electrodes until said oscillations have started, said uni-directional current flow device and said resistive impedance element being interconnected and connected between said source of potential and said point of fixed potential.

7. A transistor inverter comprising: a pair of transistors, each including output, control, and common electrodes, said common electrodes being interconnected and returned to a point of fixed potential; transformer means including first, second and third windings and a magnetic core having a substantially rectangular hysteresis loop, said first winding being connected across said output electrodes, said second winding being connected across said control electrodes, said third winding being connected across a load means; a source of energizing potential connected between said point of fixed potential and through said first winding to said output electrodes; starting means including a series connected uni-directional current flow device and impedance element connected between said source of potential and said point of fixed potential; and means including said second winding interconnecting said control electrodes and a common point between said impedance element and said uni-directional current flow device.

References Cited in the file of this patent
UNITED STATES PATENTS

| | | |
|---|---|---|
| 2,774,878 | Jensen | Dec. 18, 1956 |
| 2,780,767 | Jensen | Feb. 5, 1957 |
| 2,783,384 | Bright et al. | Feb. 26, 1957 |
| 2,826,731 | Paynter | Mar. 11, 1958 |